United States Patent [19]

Yokoyama et al.

[11] 4,274,108
[45] Jun. 16, 1981

[54] INTERLEAVED MULTIPLE SIGNAL SEPARATING CIRCUIT

[75] Inventors: Takeo Yokoyama, Ebina; Kiyoshi Fukumoto, Sagamihara; Hiroshi Matsuura, Yokohama, all of Japan

[73] Assignee: Showa Electric Wire & Cable Co., Ltd., Kawasaki, Japan

[21] Appl. No.: 52,466

[22] Filed: Jun. 27, 1979

[30] Foreign Application Priority Data

Jul. 3, 1978 [JP] Japan .................. 53-80731
Apr. 28, 1979 [JP] Japan .................. 54-52764

[51] Int. Cl.³ .......................................... H04N 9/535
[52] U.S. Cl. ............................................... 358/31
[58] Field of Search ...................................... 358/31

[56] References Cited

U.S. PATENT DOCUMENTS

| | | | |
|---|---|---|---|
| 2,729,698 | 1/1956 | Fredendall | 358/31 |
| 3,702,376 | 11/1972 | Isono et al. | 358/31 |
| 4,074,321 | 2/1978 | Miller | 358/31 |

Primary Examiner—Richard Murray
Attorney, Agent, or Firm—Lane, Aitken, Ziems, Kice & Kananen

[57] ABSTRACT

Disclosed is an interleaved multiple signal separating circuit in which a luminance signal and a chrominance signal are separated by a circuit for adding a composite video input signal including the luminance signal and chrominance signal which is delayed by a predetermined period of time by an ultrasonic solid delay line to the composite video input signal and by a circuit for subtrating the delayed composite video input signal from the composite video input signal. The separating circuit comprises a series circuit of an input transducer of the ultrasonic solid delay line and a voltage division load connected to the input transducer. The input signal is applied to the series circuit. A delay output signal from the output transducer of the ultrasonic solid delay line and a signal across the voltage division load are combined to provide a sum signal and a difference signal thereof.

5 Claims, 9 Drawing Figures

3.579545 MHz 3.579545 MHz

INTERLEAVED MULTIPLE SIGNAL SEPARATING CIRCUIT

BACKGROUND OF THE INVENTION

This invention relates to interleaved multiple signal separating circuits, and more particularly to a circuit for separating a video signal into a luminance signal and a chrominance signal in a color television or a color video tape recorder.

In the NTSC color television system, a chrominance signal is interleaved in the form of a carrier signal into the higher frequency band of a luminance signal. Therefore, it is necessary to separate the luminance signal and the chrominance signal from each other by using a band pass filter or the like; otherwise the two signals are interfered by each other, with the result that the picture quality is lowered.

In general, when a chrominance signal is separated from the video signal by a band pass filter whose central frequency is the carrier frequency of the chrominance signal, the higher frequency component of the luminance signal, included in the signal causes chromatic noise, i.e. cross color interference. If the carrier chrominance signal remains in the higher frequency component of the luminance signal, then dot interference is caused.

In order to relieve these interferences, the high frequency component of the luminance signal is reduced by the signal transmitting side, or the amplification degree of the higher frequencies in the luminance signal amplification system of a television set is reduced. However, these methods are disadvantageous in that the resolution is decreased.

Recently, research has been conducted to eliminate these interferences by using a comb filter with a solid ultrasonic delay line. As shown in FIG. 1, a video signal inputted through an input terminal 1 is delayed by one horizontal scanning period by a 1H delay line 2, and the video signal thus delayed is combined with the video signals which are applied directly (not delayed) through bypass circuits 3 and 4. As a result, the chrominance signal is provided at the output of a C type filter 5 which provides a difference signal of the two signals (the delayed signal and the not delayed signal), and the luminance signal is provided at the output of a Y type filter 6 which provides a sum signal of the two signal.

In this circuit shown in FIG. 1, the C type filter having a characteristic as shown in FIG. 2 is combined with the Y type filter having a characteristic as shown in FIG. 3 (a comb filter being formed), and therefore the video signal can be separated into the chrominance signal and the luminance signal.

In general, in order to satisfactorily operate a solid delay line such as a glass delay line, anti-resonate coils must be connected in parallel to the input and output transducers, respectively. In this case, the glass delay line shows a band pass characteristic in which the higher and lower frequencies are cut off. Accordingly, if the pass band of the glass delay line is set to a range whose center is the frequency band of the chrominance signal, then the lower frequency component of the chrominance signal is blocked in the circuit shown in FIG. 1, and accordingly it is necessary to provide a low-pass filter additionally to mix the lower frequency component with the luminance signal output in FIG. 1.

However, with such a mixing circuit, it is difficult to correctly phase signals, and the frequency characteristic is not flat. Therefore, a ghost-like ringing phenomenon attributing to the transient response of the ultrasonic delay line occurs in the picture. Accordingly, it is necessary to provide a more intricate circuit to prevent the ringing which leads to an increase in manufacturing cost. Thus, the circuit has not put to practical use yet.

SUMMARY OF THE INVENTION

The above-described drawbacks in the prior art have been successfully eliminated by the present invention.

A primary object of the invention is to provide a signal separating circuit which can satisfactorily separate the above-described interleaved multiple signals.

Another object of the invention is to provide an improved signal separating circuit which can separate a chrominance signal and a luminance signal in a television set or color video tape recorder.

The foregoing objects and other objects of the invention have been achieved by the provision of an interleaved multiple signal separating circuit in which a luminance signal and a chrominance signal are separated by a circuit for adding a composite video input signal including the luminance signal and chrominance signal which is delayed by a predetermined period of time by an ultrasonic solid delay line to the composite video input signal which is not delayed, line by a circuit for substracting the delayed composite video input signal from the composite video input signal not delayed; comprising a series circuit of an input transducer of the ultrasonic solid delay line and a voltage division load connected to the input transducer, the input signal being applied across the series circuit, a delay output signal from an output transducer of the ultrasonic solid delay line and a signal across the voltage division load being combined to provide the sum signal and the difference signal thereof.

The novel features which are considered characteristic of this invention are set forth in the appended claims. The invention itself, however, as well as other objects and advantages thereof will be best understood by reference to the following detailed description of illustrative embodiments, when read in conjunction with the accompanying drawings.

BRIEF DESCRIPTION OF THE DRAWINGS

In the accompanying drawings.

DETAILED DESCRIPTION OF PREFERRED EMBODIMENTS

Figure 1:
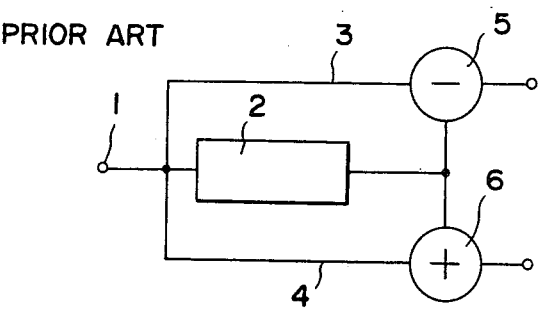
FIG. 1 is a block diagram showing a conventional comb filter.
Figure 2:
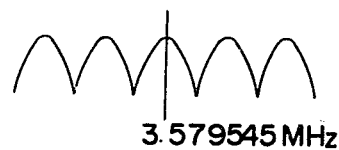
FIGS. 2 and 3 are diagrams indicating the band pass characteristics of filteres shown in FIG. 1.
Figure 3:
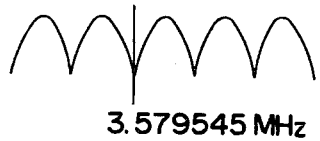
Figure 4:
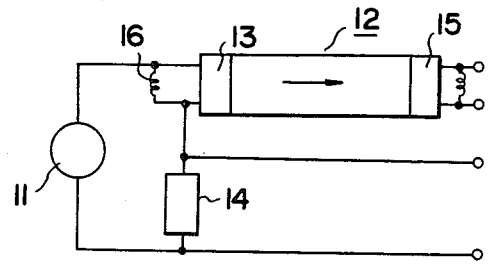
FIG. 4 is a block diagram showing a fundamental embodiment of the other interleaved multiple signal separating circuit according to the invention.

One embodiment of an interleaved multiple signal separating circuit according to this invention is as shown in FIG. 4. An input signal from a signal source 11 is applied across a circuit constituted by an input transducer 13 of an ultrasonic solid delay line (unitary or composite glass delay device) 12 and a voltage division load 14 connected in series to the input transducer 13, and a delay output signal from an output transducer 15 of the delay line 12 and a signal across the voltage division load 14 are combined to obtain the sum and the difference of the two signals, or a sum signal and a difference signal.

The fundamental specific feature of the separating circuit described above resides in its function that, in FIG. 4, the input signal is subjected to voltage division by the transducer 13 of the delay line including an anti-resonate coil 16 and the voltage division load 14, and for the frequencies lower than the pass band of the delay line the signal applied across the voltage division load is delivered to the output side, while for the frequencies within the pass band of the delay line, the interleaved multiple input signal is satisfactorily separated into two components by utilized the above-described comb filter characteristic.

The invention will be described concretely.

Figure 5:
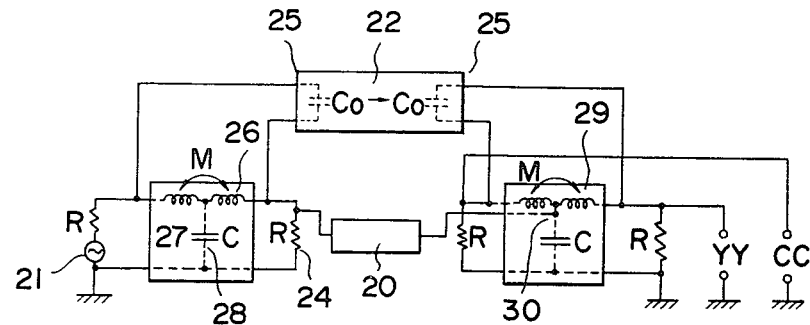
FIG. 5 is a circuit diagram showing an concrete embodiment of the signal separating circuit according to the invention.

FIG. 5 shows a concrete embodiment of the interleaved multiple signal separating circuit according to the invention, in which a color television video signal input 21 is separated into a chrominance signal output C-C and a luminance signal output Y-Y.

An anti-resonate coil 26 is connected in parallel to an input transducer 23 of a delay line, and the mid point 27 of the anti-resonate coil 26 is grounded through a capacitor 28 to form an induction M type circuit. A voltage applied to a voltage division load 24 is applied through a level adjustment circuit 20 to the mid point 30 of an anti-resonate coil 29 of an output transducer 25. An induction M type circuit similar to that for the input side is provided for the output side.

Figure 9:
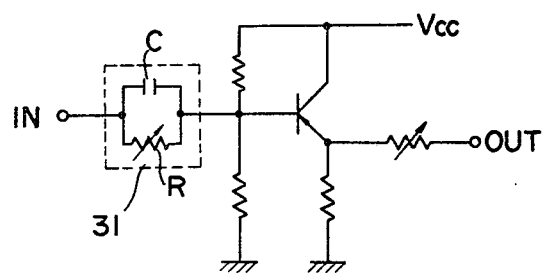
FIG. 9 is a circuit diagram showing a level adjustment circuit in FIG. 5 in detail.

The level adjustment circuit 20 may be made up of conventional fixed resistors and variable resistors. If an emitter follower circuit is employed for the level adjustment circuit, then it is advantageous in that the level adjustment circuit can be readily adjusted with the variable resistors because the input and output circuits are scarcely interfered by each other and the output serves as the current source. Furthermore, if the level adjustment circuit 20 is formed as shown in FIG. 9, then advantages as described later can be obtained.

Figure 6:
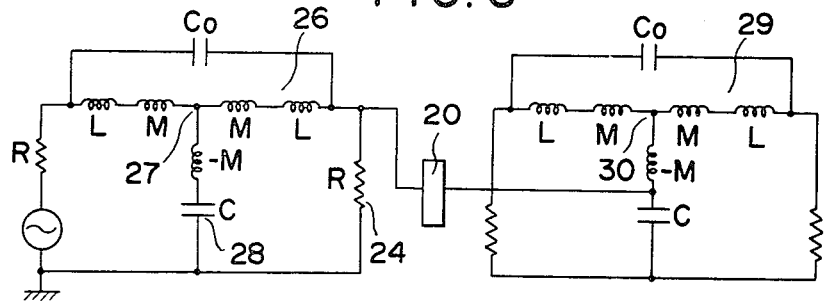
FIGS. 6, 7 and 8 show equivalent circuits of the circuit shown in FIG. 1, corresponding to the using frequencies.

The equivalent circuit of the above-described embodiment in a frequency range (about 0–2.5 MHz) lower than the operating frequency band of a glass delay line is as shown in FIG. 6. In FIG. 6, reference character Co designates the clamped capacitance of the input and output transducers; L, the inductance of a half of each antiresonate coil; and M, the mutual inductance of the halves of each anti-resonate coil.

If, in this circuit, L is substantially equal to M, then the input and output impedance Zo is:

$$Z_o = \sqrt{\frac{4 \cdot \frac{C}{L}}{1 - 4\omega^2 L C_o}}$$

If the using frequency band of the circuit is selected to be in a range of $1 > 4\omega^2 L \cdot C_o$, then the circuit has no reactance component and the signal voltage applied across the voltage division load is not shifted in phased from the input voltage.

In the range of $1 > 4\omega^2 L \cdot C_o$, the input and output impedance is $2\sqrt{L/C}$ and the frequency dependence is minimized. It goes without saying that, in this case, the value of C is so determined that $Z_o = R$.

Figure 7:
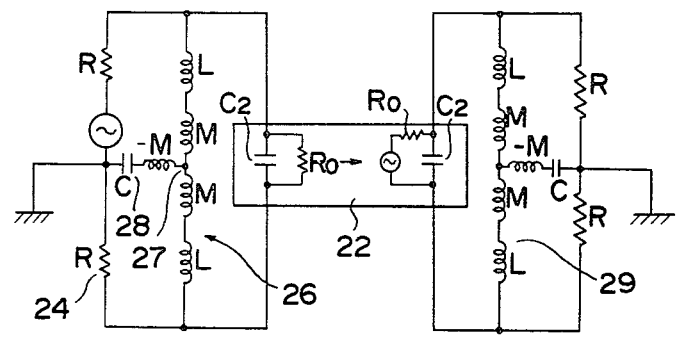
Figure 8:
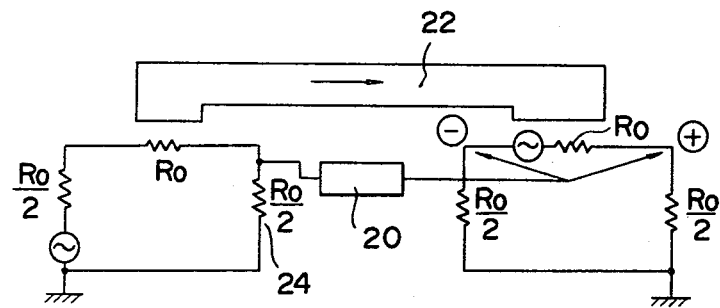

In the frequency range (about 2.5–4.5 MHz) in which the glass delay line is operable, the equivalent circuit is as shown in FIG. 7, in which reference characters $R_0$ and $C_2$ designates the equivalent resonance resistance of the delay line and the equivalent resonance capacitance of the same, respectively. In the circuit shown in FIG. 7, when the glass delay line is operated, then the above-described equivalent resonance capacitance $C_2$ and the anti-resonate coil carry out parallel resonance. If the quality factor Q is increased, then the equivalent circuit can be regarded as an equivalent circuit as shown in FIG. 8. If, in this connection, the inductance of each anti-resonate coil is 4L, and $2R = R_0$, then the glass delay line operates most efficiently.

In the circuit of FIG. 8, the signal passed through the glass delay line 22 and the signal applied to the voltage division load 24 are combined to provide the sum signal and the difference signal; that is, the above-described comb filter is formed.

The level adjustment circuit 20 may be formed as shown in FIG. 9. That is, a phase circuit 31 consisting of a variable resistor R and a capacitor C is connected to the input of a transistor circuit. This circuit is advantageous in that, when the ratio of the resistance R to the capacitance C is changed, the null point can be changed without changing the frequency characteristic of the comb filter.

With the circuit as shown in FIG. 5, the pulse response is excellent as a whole and a considerably flat output characteristic can be obtained, because the lower frequency signal output which does not pass through the glass delay line is not shifted in phase from the high frequency signal output which passes through the glass delay line.

According to the above-described method of the invention, a frequency band sufficient to pass a color television video signal can be obtained by the relatively simple circuitry, and the chrominance signal can be separated from the luminance signal by the utilization of the comb filter characteristic attributing to the delay line, with the result that a color television circuit low in cost and high in resolution can be obtained.

Even if, in practicing the invention, the voltage division load in FIG. 5 is replaced by a resistor with taps or a coil with taps, or the capacitor is disconnected from the mid point of the anti-resonate coil, the circuit phase characteristic is much more excellent than that in the conventional system, and therefore if the values of these components are suitably selected, then the thus modified circuit is sufficiently practical.

This invention has been described with reference to the embodiment which is applied to the NTSC system color television circuit; however, it should be noted that the invention is not limited thereto or thereby; that is, the invention can be applied to an electronic video apparatus, for example, color television in the PAL system or the SECAM system or color video recorder, having the interleaved multiple signal separating circuit.

Thus, there is provided in accordance with the invention an interleaved multiple signal separating circuit which has the advantage discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. An interleaved multiple signal separating circuit in which a luminance signal and a chrominance signal are separated by a circuit for adding a composite video input signal including said luminance signal and chrominance signal which is delayed by a predetermined period of time by an ultrasonic solid delay line to said composite video input signal and by a circuit for subtracting said delayed composite video input signal from said composite video input signal; comprising:
   a series circuit of an input transducer of said ultrasonic solid delay line and a voltage division load connected to said input transducer,
   said input signal being applied across said series circuit,
   a delay output signal from an output transducer of said ultrasonic solid delay line and a signal across said voltage division load being combined to provide the sum and the difference of said two signals.

2. A circuit as claimed in claim 1 for separating a luminance signal and a chrominance signal in a color television or a color video tape recorder, in which said ultrasonic solid delay line delays an input signal to said input transducer by one horizontal scanning period and delivers the input signal thus delayed to said output transducer.

3. A circuit as claimed in claim 2 for separating a luminance signal and a chrominance signal in a color television or a color video tape recorder, in which anti-resonate coils are connected in parallel with said input transducer and output transducer, respectively, and a signal across said voltage division load is applied through a level adjustment circuit to the mid tap of said anti-resonate coil of said output transducer.

4. A circuit as claimed in claim 3 for separating a luminance signal and a chrominance signal in a color television or a color video tape recorder, in which said level adjustment circuit employs an emitter follower circuit.

5. A circuit as claimed in claim 3 for separating a luminance signal and a chrominance signal in a color television or a color video tape recorder, in which said level adjustment circuit is provided with a phase circuit.

* * * * *